United States Patent
Regnault de la Mothe et al.

(10) Patent No.: US 8,689,894 B2
(45) Date of Patent: Apr. 8, 2014

(54) METHOD AND COMPOSITION FOR ZONAL ISOLATION OF A WELL

(75) Inventors: Loïc Regnault de la Mothe, Paris (FR); Sylvaine Le Roy-Delage, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 713 days.

(21) Appl. No.: 12/594,710

(22) PCT Filed: Mar. 21, 2008

(86) PCT No.: PCT/EP2008/002433
§ 371 (c)(1),
(2), (4) Date: Feb. 16, 2010

(87) PCT Pub. No.: WO2008/122372
PCT Pub. Date: Oct. 16, 2008

(65) Prior Publication Data
US 2010/0163252 A1    Jul. 1, 2010

(30) Foreign Application Priority Data

Apr. 6, 2007  (EP) .................................... 07290430

(51) Int. Cl.
*E21B 33/12* (2006.01)
*E21B 33/13* (2006.01)

(52) U.S. Cl.
USPC ............ 166/387; 166/179; 166/292; 166/293

(58) Field of Classification Search
CPC ................ E21B 33/1208; E21B 33/14; C04B 2103/0049
USPC .................. 166/387, 100, 295, 293, 292, 179
See application file for complete search history.

(56) References Cited

U.S. PATENT DOCUMENTS

| | | | |
|---|---|---|---|
| 2,849,070 | A | 8/1958 | Maly et al. |
| 2,945,541 | A | 7/1960 | Maly et el |
| 3,385,367 | A | 5/1968 | Paul |
| 3,385,567 | A | 5/1968 | Case et al. |
| 3,918,523 | A | 11/1975 | Stuber |
| 4,137,970 | A | 2/1979 | Laflin et al. |
| 4,862,967 | A | 9/1989 | Harris |
| 4,936,386 | A | 6/1990 | Colangelo |
| 5,048,605 | A | 9/1991 | Toon et al. |
| 6,328,113 | B1 | 12/2001 | Cook |
| 6,431,282 | B1 | 8/2002 | Bosma et al. |
| 6,581,682 | B1 | 6/2003 | Parent et al. |

(Continued)

FOREIGN PATENT DOCUMENTS

| EP | 1315883 | 3/2006 |
|---|---|---|
| EP | 1407113 | 3/2006 |

(Continued)

*Primary Examiner* — Kenneth L Thompson
*Assistant Examiner* — Michael Wills, III
(74) *Attorney, Agent, or Firm* — Michael Dae

(57) ABSTRACT

The invention provides a system comprising: a tubular containing a first surface comprising a coating made of a first swellable material coating said first surface, wherein said coating has a second surface and said first swellable material is able to swell in contact with a first fluid on said second surface; and a composition made of a settable material and a second swellable material able to swell in contact with a second fluid. The invention also discloses the method associated with the use of such a system.

18 Claims, 8 Drawing Sheets

(56) References Cited

U.S. PATENT DOCUMENTS

| | | |
|---|---|---|
| 6,834,725 B2 | 12/2004 | Whanger et al. |
| 6,848,505 B2 | 2/2005 | Richard et al. |
| 6,854,522 B2 | 2/2005 | Brezinski et al. |
| 6,907,937 B2 | 6/2005 | Whanger et al. |
| 6,935,432 B2 | 8/2005 | Nguyen |
| 7,059,415 B2 | 6/2006 | Bosma et al. |
| 7,080,688 B2 * | 7/2006 | Todd et al. .................... 166/278 |
| 7,121,352 B2 | 10/2006 | Cook et al. |
| 7,143,832 B2 | 12/2006 | Freyer |
| 2004/0020662 A1 | 2/2004 | Freyer |
| 2004/0055758 A1 | 3/2004 | Brezinski et al. |
| 2004/0168802 A1 * | 9/2004 | Creel et al. .................... 166/293 |
| 2005/0077052 A1 | 4/2005 | Ohmer |
| 2005/0110217 A1 | 5/2005 | Wood et al. |
| 2005/0199401 A1 | 9/2005 | Patel et al. |
| 2006/0005973 A1 | 1/2006 | Harrall et al. |
| 2006/0122071 A1 * | 6/2006 | Reddy et al. ................. 507/219 |
| 2006/0174805 A1 * | 8/2006 | Chatterji et al. ............. 106/724 |
| 2007/0137528 A1 | 6/2007 | Le Roy et al. |
| 2007/0204765 A1 | 9/2007 | Le Roy et al. |
| 2007/0227734 A1 * | 10/2007 | Freyer .......................... 166/295 |
| 2008/0011473 A1 * | 1/2008 | Wood et al. ................... 166/179 |
| 2008/0099203 A1 * | 5/2008 | Mueller et al. ................ 166/293 |
| 2008/0149351 A1 * | 6/2008 | Marya et al. .................. 166/387 |
| 2008/0220991 A1 * | 9/2008 | Slay et al. ..................... 507/203 |
| 2010/0126722 A1 * | 5/2010 | Cornelissen et al. .......... 166/278 |

FOREIGN PATENT DOCUMENTS

| | | |
|---|---|---|
| EP | 1649136 | 6/2006 |
| EP | 1669540 | 6/2006 |
| EP | 1672166 | 11/2007 |
| EP | 16722166 | 11/2007 |
| GB | 2388136 | 8/2002 |
| GB | 2388163 | 11/2003 |
| GB | 2410515 | 8/2005 |
| GB | 2414495 | 11/2005 |
| WO | 0220941 | 3/2002 |
| WO | 03008756 | 1/2003 |
| WO | 2005012686 | 2/2005 |
| WO | 2006065144 | 6/2006 |
| WO | 2006079659 | 8/2006 |

* cited by examiner

METHOD AND COMPOSITION FOR ZONAL ISOLATION OF A WELL

FIELD OF THE INVENTION

The present invention broadly relates to well cementing. More particularly the invention relates to composition for treating downhole wells from a subterranean reservoir, such as for instance an oil and gas reservoir or a water reservoir. Also, the composition may be useful for zonal isolation.

DESCRIPTION OF THE PRIOR ART

After a well has been drilled, the conventional practice in the oil industry consists in lining the well with a metal casing. The casing is lowered down the hole and cement is pumped inside the casing and returns through the annulus (or annular space) where it is allowed to set. The lining serves a dual purpose: preventing the borehole walls from collapsing and isolating the various geological strata and thus, avoiding exchange of fluids between them. However, there are situations where the set cement is unable to fulfill its entire functional role and to provide the expected zonal isolation, the well thereby losing its integrity. Such situations occur when the cement slurry is not placed properly (poor conditions of placement, poor or absence of centralization, slim holes, incomplete mud removal) which results in the formation of channels. Or they occur during the cement lifetime when the conditions are such that the cement is likely to fail due to pressure and/or temperature variations (development of micro annuli either between the fluid conduit and the cement or between the cement and the formation, cracks). As it affects hydrocarbon production and therefore results in loss of revenues, losing well integrity has to be prevented.

Prior art solutions were proposed to solve the problem of well integrity. Especially, swellable materials are well known for annular zonal isolation in hydrocarbon wells. A swellable material is a material that can swell i.e. increases its volume or its apparent volume like a sponge. Usually physically attached around tubulars in cased-hole (i.e. a well comprising a casing) or open-hole (i.e. a well without casing) configurations, they can be involved in packer systems designed to prevent fluid migration in the annular space. In cased-hole situations, the annular space is defined between two tubulars (production tubing and outer casing for example). In open-hole situations, the annular space is defined between the tubular (casing, production tubing) and the wellbore wall. After deployment of the system tubular/swellable material in the well, the swellable material swells and expands to seal the annular space defined above. The role of the swollen material is therefore to ensure support and stability of the inner tubular and to provide fluid isolation. In open-hole configurations, the use of swellable material-based packers is considered to be their ability to replace cement.

Following prior arts disclose embodiment of system tubular/swellable material. U.S. Pat. Nos. 2,849,070 and 2,945,541 relate to a packer made of hydrocarbon-swellable elastomers. The packer is attached to a tubular deployed in a borehole (open or cased hole). Made of rubber preferably but also of swelling clays and cellulosic materials, this material is able to swell and seal the annulus. U.S. Pat. No. 3,918,523 relates to swellable bracelets surrounding tubulars for annular isolation. The bracelets are made of a swelling agent protected by a coating that can be dissolved by either temperature or drilling fluids. Also, the purpose of the coating is to delay swelling thus allowing time for deployment in the well.

Other improvements on prior art system have been done to control more precisely the swelling of the material in downhole conditions. U.S. Pat. No. 4,936,386 discloses a further method to seal an annulus between a tubular and a wellbore wall by using swellable-discs stacked on top of each other around the casing. The discs can be made water-swellable (made of solid bentonite clay or granular bentonite) or oil-swellable (the bentonite is grafted with organophillic materials such as polyquaternary amines). U.S. Pat. No. 6,581,682 discloses a packer made of two concentric sleeves defining an annular chamber containing a water-swellable material such as bentonite. The outer sleeve is perforated to allow wellbore fluid migration from the well to inside the packer thereby triggering swelling of the swellable material and therefore expansion of the packer. Also, U.S. Pat. No. 7,121,352 describes a zonal isolation apparatus comprising water-swellable elastomeric seals surrounding one of the tubulars. U.S. Pat. No. 5,048,605 deals with a packing-seal for boreholes. Among all the features described, it is mentioned that the element comprises a perforated tubular comprising a layer of water-swellable material coated by several layers of other materials. When swelling, the swellable material pushes the coated layers against the borehole wall, thereby creating a seal in the annulus. The swellable material swells by exposure to water, which is allowed by the perforations mentioned above. U.S. Pat. No. 7,143,832 discloses a method and a rubber-made hydrocarbon-swellable packer for sealing the annular space between a production tubing and a hydrocarbon well wall (open or cased hole). The packer forms part of the completion string and swells upon exposure to hydrocarbons present in the well. It comprises a high swelling elastomeric core coated by a low swelling elastomeric external mantle so that swelling is delayed, thereby allowing time for placement. EP patent 1649136 discloses a system and a method to seal an annulus in a wellbore (open and cased hole) by means of a saline-water-swellable packer comprising (a) a swellable elastomeric matrix, (b) polar SAP groups grafted onto the elastomeric backbone and (c) salt particles embedded in the elastomeric matrix. An external coating can be incorporated to the element to protect it during placement in the well. The system can comprise several rings, and is attached around the tubular.

In the same way, prior art systems have been done to control swelling by reacting with hydrocarbon and/or with water. U.S. Pat. No. 7,059,415 discloses a system consisting of rubber-made water-swellable and hydrocarbon-swellable packers used to seal the annulus between a tubular and a well wall (open or cased hole). It also discloses dual-functionality-packers (swell in contact with both oil and water). U.S. Pat. No. 6,848,505 discloses a method of sealing a tubular string in a wellbore, the method being designed to replace well cementing operations. Sealing the annulus is achieved by swelling of the elastomeric jacket that covers the tubular. Swelling occurs upon exposure to well fluids. The swellable elastomeric material can be water-swellable or oil-swellable, swelling upon exposure of formation or drilling fluids.

Swellable materials can also be involved in annular sealing systems mounted on expandable tubulars. The swellable material is placed on the outer side of the tubular. After expansion of the tubular, the swellable material swells and seals the annular space between the tubular and the borehole wall.

Following prior arts are examples of expandable tubulars associated with swellable materials. U.S. Pat. No. 4,137,970 describes the use of a swellable jacket surrounding a mechanically expandable tubular, for the purpose of annular isolation. After tubular expansion, the swellable material is able to swell in contact with aqueous fluids. U.S. Pat. No. 4,862,967 describes an expandable tubular surrounded by a hydrocarbon-swellable packer which is rubber-made. The packer is coated by a fluororubber or silicon rubber-based layer which delays swelling and resists to high temperatures (up to 600 F). U.S. Pat. No. 6,431,282 describes a method to seal the annulus between two tubulars or between an expandable tubular and a borehole wall which is adapted to various configurations: circular wells, elliptical boreholes, large wash-outs. After mechanical expansion of the tubular, the seal is provided by conventional elastomers or thermoplastic elastomers attached to the tubular. In the latter case, heating of the well is required so that the thermoplastic takes shape properly. U.S. Pat. No. 6,907,937 describes a sealing apparatus for isolating an expandable tubular having a recessed portion around which water-swellable or hydrocarbon-swellable rubber-made rings (covered by a protective mantle) are placed. The mechanical expansion of the tubular induces breaking of the cover such that contact between the swellable rings and wellbore fluids is promoted, thereby inducing swelling of the elastomeric rings.

Cited prior arts allow cement replacement by ensuring casing support and zonal isolation provided by swellable packers attached to the casing, thereby bringing several improvements to the traditional operation of primary cementing. The deployment is simpler and avoids problems associated with cement placement and cement ageing, zonal isolation being maintained thanks to swellable materials' ability to permanently swell and adjust to any geometry and size of gap to fill. However, there are mechanical property-related issues as well as durability-related uncertainties associated with swellable packers/sleeves. Therefore it was proposed to associate them with cement to improve well integrity. Effectively, the cement brings mechanical support to the casing and the swellable material provides a reliable annular seal (annular space between the casing and the cement) where the cement fails to do so.

Following prior arts interest in dual use of swellable material and cement, US patent application 20050199401 describes a sealing system, such as a packer, for use in a subterranean wellbore comprising a swellable material disposed on a conveyance device wherein the swellable material swells when in contact with a triggering fluid. The sealing system can be made water-swellable or oil-swellable. The system is applicable in open and cased holes and covers the association of the swellable material with cement by stating that cement can be placed adjacent the swellable material. US patent application 20060005973 discloses methods to seal tubulars (that can be expandable) in a wellbore using a sealing medium coating the tubulars. The method comprises the step of cementing the annulus between the borehole wall and the tubular and the step of activating the sealing medium. Among the configurations that are described, it is disclosed that the sealing medium can be a sleeve attached to the casing, thereby sitting between the cement and the tubular. It may be swellable-elastomer-based, swelling being triggered by hydrocarbon-based fluids, water-based fluids, drilling fluids, water from cement or injected chemical agents. Finally, International application WO 2006065144 describes a method and a device for sealing a void incompletely filled with a cast material. The device comprises an expandable material in the form of a sleeve encircling a pipe. The pipe is to be deployed in the borehole before the annulus (between the bore wall and the pipe) is filled with a cast material (typically cement). After the cast material has cured, the expandable material expands into spaces that have not been filled with cast material, thereby providing complete isolation and shutting off fluid channels. The expandable material can be a swellable material (rubber-made) or foam-like diffusible material and is said to expand on contact with water, oil or gas.

When associated with cement, swellable sleeves attached to the casing improve zonal isolation by being able to seal micro annuli at the interface between the casing and the cement (due to bad mud removal or debonding) and by bridging gaps not filled with cement due to improper placement (eccentricity, slim holes). This way, support of the casing is assured by cement. However, any crack appearing in the cement matrix, or any channel appearing between the formation and the cement will still induce loss of isolation that systems described above are not able to solve.

Thus, there is a need for an improved method and an improved system to seal the annular space between a wellbore wall and the casing in a hydrocarbon well which minimizes and tackles any kind of loss of well integrity/zonal isolation mentioned above, thereby overcoming the drawbacks of the prior art.

SUMMARY OF THE INVENTION

The purpose of the present invention is to avoid and minimize such zonal isolation problems by providing a reliable annular seal between the formation and the casing. The present invention is based on a technology comprising a swellable material associated with an adaptive settable material.

In a first aspect, the invention discloses a system comprising: a tubular, preferably substantially cylindrical, containing a first surface comprising a coating made of a first swellable material coating said first surface, wherein said coating has a second surface and said first swellable material is able to swell in contact with a first fluid on said second surface; and a composition made of a settable material and a second swellable material able to swell in contact with a second fluid. On the first hand, swellable materials have the characteristic property to be able to move from a retracted position to an expanded position when exposed to the action of a triggering agent. The triggering agent may be a fluid absorbed by the material that consequently swells. In its expanded position, the volume of the swellable material is greater than in its non-swollen position, which makes it able to fill adjacent spaces unoccupied prior to swelling and therefore to seal fluid channels in its vicinity. Swellable materials can be deployed downhole in their retracted position prior to swelling which is activated downhole. On the second hand, the composition can accommodate problems that occur once the set material sheath has failed. This responsive composition develops self healing properties in contact with the second fluid. It can be self-repaired by hydrocarbon fluid liquids or gas or water fluids coming from the formation or any suitable triggering fluid pumped from surface.

Preferably, the coating is further flexible. Flexible materials have the ability to easily bend. The coating is therefore able to distribute the stress load from the tubular thereby decreasing the stresses on the settable material. So the risk of crack formation is reduced by the presence of the flexible coating around the tubular, its role being to spread the stress load applied on the settable material.

The coating can be put on the inner surface of the tubular, on the outer surface of the tubular or on both surfaces of the tubular.

Preferably, the system further comprises a first protective coating coating said second surface and able to prevent and/or delay contact between the first swellable material and the first fluid and/or an alternative protective coating coating said first swellable material and able to prevent and/or delay contact between the first swellable material and the first fluid and/or a second protective coating coating said second swellable material and able to prevent and/or delay contact between the second swellable material and the first fluid and/or the second fluid.

The first fluid and the second fluid may be the same or different depending of the application. The first fluid and/or the second fluid may be anyone taken in the list constituted of: gas, water, oil, aqueous fluid, non-aqueous fluid, multi-phasic fluid and a combination thereof. Advantageously, the settable material further comprises any element taken in the list constituted of: fiber, flexible particle and a combination thereof.

In another embodiment, the coating further comprises a third swellable material able to swell in contact with a third fluid. And in a still other embodiment, the settable material further comprises a fourth swellable material able to swell in contact with a fourth fluid.

In a preferred embodiment the settable material is cement and the tubular is a casing. The cement can also contain fibers to improve the toughness of the material. For instance the fibers can be made in nylon, polypropylene, metal, carbon. All type of fibers known in this oilfield art to improve the toughness of the material are suitable. The cement can also contain flexible particles (polymer material such as, for instance, polypropylene, polyethylene, acrylonitrile rubber, styrene divinylbenzene, styrene butadiene) to confer an additional degree of flexibility on the cement sheath in addition to its self-healing properties thanks to the presence of the second swellable material.

In a second aspect, the invention discloses a method to consolidate a subterranean formation in a well, comprising the steps of: lowering in the well, a tubular, preferably substantially cylindrical, containing a first surface comprising a coating made of a first swellable material coating said first surface, wherein the coating has a second surface and said first swellable material is able to swell in contact with a first fluid on said second surface; placing a settable material and a second swellable material able to swell in contact with a second fluid, wherein said settable material and said second swellable material are placed in the vicinity of the second surface; allowing the settable material to set; allowing the first swellable material to swell in contact with the first fluid.

Preferably, the method further comprises the step of allowing the second swellable material to swell in contact with the second fluid. Advantageously, during reaction of the first swellable material with said first fluid, the second swellable material is substantially inactive. In other words, after reaction of the first swellable material with said first fluid, the second swellable material is still able to swell in contact with the second fluid, because all the second swellable material has not reacted.

The first fluid and the second fluid may be the same or different depending of the application.

Preferably, the coating is further flexible. Flexible materials have the ability to easily bend. The method is therefore able to distribute the stress load from the tubular thereby decreasing the stresses on the settable material.

Preferably, the method further comprises the tubular with a first protective coating coating said second surface and able to prevent and/or delay contact between the first swellable material and the first fluid and/or an alternative protective coating coating said first swellable material and able to prevent and/or delay contact between the first swellable material and the first fluid and/or a second protective coating coating said second swellable material and able to prevent and/or delay contact between the second swellable material and the first fluid and/or the second fluid.

Preferably the settable material is cement. Another method to improve the resistance of the cement to physical stresses involves the addition of fibrous or ribbon-like materials to increase the toughness of the cement matrix.

BRIEF DESCRIPTION OF THE DRAWINGS

Further embodiments of the present invention can be understood with the appended drawings.

DETAILED DESCRIPTION

Figure 1A:
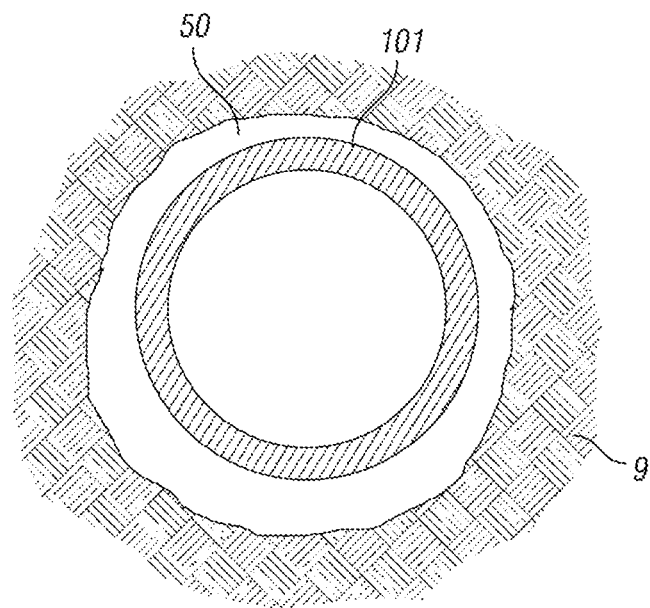
FIGS. 1A and 1B show an example of annulus left by a casing not properly centralized.

The role of the cement placed between the casing and the wellbore wall in a hydrocarbon well is to provide mechanical support to the casing and to ensure good annular zonal isolation. However, due to poor cement placement and to stresses applied by both the casing and the formation, the cement may fail in ensuring well integrity. Examples of zonal isolation problems are described below. The first example consists of eccentric well geometries, illustrated in FIGS. 1A and 1B. In a well in subterranean formation 9, a casing 101 is placed to consolidate formation. When the casing 101 is not centralized in the borehole, the eccentricity can be such that the cement cannot be placed properly in an annulus 5 between the casing and the wellbore wall. As a result, the annulus between the casing 101 and the formation 9 is partly filled with the cement 501, leaving portions of the annulus 5B not filled with cement. Another example of zonal isolation problem relates to microannuli shown on FIGS. 2A and 2B. Microannuli can appear either between the casing 101 and the cement 501 (as shown on FIG. 2A) or between the formation 9 and the cement 501 (as shown on FIG. 2B). For example, bad drilling mud removal may occur while pumping the cement slurry in the annulus, thereby leaving mud films either between the casing and the cement 15 or between the cement and the formation 16. This results in fluid channeling and loss of zonal isolation. Both types of microannuli may also appear during the cement lifetime due to the phenomenon of cement debonding. A more complex zonal isolation problem consists of cracks in the cement as shown on FIG. 3. Cracks 8 develop due to cement ageing, seismologic activity in the formation or vibrations of the casing or pressure/temperature variation.

Figure 4:
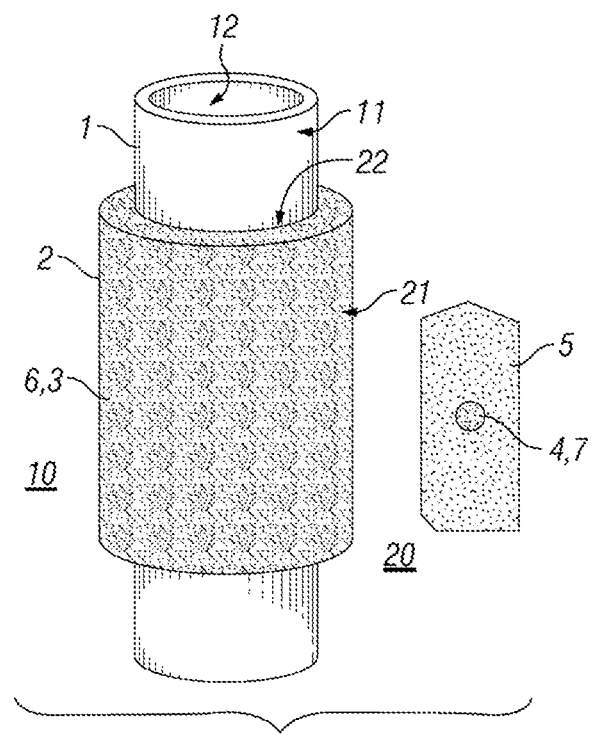
FIG. 4 shows the system according to the invention.

According to a first aspect of the invention, a system 10 is disclosed which consists of the association of a flexible swellable coating attached to a tubular and of an adaptive cement or more generally to a settable material with a second swellable material. FIG. 4 illustrates the tubular 1 having an internal surface 12 and an outer surface 11. The tubular is preferentially substantially cylindrical with a thickness t. The tubular comprises a coating 2 made of a first swellable material 3 able to swell in contact with a first fluid 6. The coating 2 has an internal surface 22 and an outer surface 21. The coating is preferentially substantially cylindrical with a thickness $t_1$ and is preferentially securely attached to the outer surface of the tubular 11 via the inner surface of the coating 22. Attachment can be made by any type of system: glue, hot melting, hot vulcanization, screwing, interlocking . . . . The first fluid 6 is any type of fluid, which may be liquid or gaseous or multi-phasic. Preferably, the fluid is aqueous or non-aqueous e.g. water, oil or hydrocarbon-based fluids, solvents, gases, fluids from the formation, wellbore fluids, drilling fluids, fluids pumped from surface or a combination thereof.

The first swellable material is able to swell in contact with the first fluid 6. Swellable materials means as defined, that the material can swell, i.e. increases its volume or its apparent volume like a sponge. Preferably, the first swellable material remains in the swollen state when still subjected to first fluid. The coating is preferentially entirely made of a uniform layer of swellable material coating the tubular, with a thickness $t_1$ between 0.2 millimeters and 10 centimeters. The coating 2 is also preferentially flexible. By flexible it is meant that the coating has an elasticity allowing a deformation of the geometry when subjected to stress or tension. It is therefore able to distribute the stress load from the tubular thereby decreasing the stresses on the settable material. So the risk of crack formation is reduced by the presence of the flexible coating around the tubular, its role being to spread the stress load applied on the settable material. Crack formation in the set material is therefore reduced. The material of the coating may be made of a water-swellable elastomer, a hydrocarbon-swellable elastomer, a gas-swellable elastomer or a combination of both. It may be made of a composite material and comprise further other materials. For example, it may include fillers. The fillers may be water-swellable, gas-swellable, oil-swellable or swellable to both oil and water or/and gas.

Suitable water-swellable materials include acrylic acid type polymers, carboxymethyl cellulose type polymers, highly swelling clay minerals, isobutylene maleic anhydride, polyethylene oxide polymers, polyvinyl alcohol cyclic acid anhydride graft copolymer, sodium bentonite (montmorillonite), starch polyacrylate acid graft copolymer, starch polyacrylonitrile graft copolymers, vinyl acetate-acrylate copolymers, and combination thereof. More generally, they can also include SAP (Super Absorbent Polymer) or hydrogels.

Suitable hydrocarbon-swellable (oil and/or gas) materials include natural rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, polynorbornen, styrene butadiene rubber, styrene/propylene/diene monomer, brominated poly(isobutylene-co-4-methylstyrene) (BIMS), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomer, substituted styrene acrylate copolymer and combination thereof.

In a further embodiment (not shown on Figure), the coating 2 may comprise further other different swellable material, e.g. gas swellable material. Also, the coating 2 may comprise further other coating made of different swellable material i.e. multi-layer coatings made of various swellable materials.

In a further embodiment (not shown on Figure), the coating 2 may comprise further a protective coating. The protective layer surrounds the first swellable material or the coating 2 and its purpose is to prevent and/or delay contact between the first swellable material 3 and the first fluid 6. In this way, premature swelling is prevented and time for deployment of the tubular is allowed. The second layer is preferably a uniform layer coating the coating 2, with a thickness $t_2$ between 20 micrometers to 5 centimeters, and more preferably between 20 micrometers to 1 millimeter. For example, the protective layer degrades or slowly swells to become partially permeable and allow activation fluid transfer towards the swellable coating. Deactivation of the protective layer may be triggered by several factors such as time, temperature, pressure, variations of pH or salinity changes. The trigger may also be stimulated by electromagnetic waves, as for example, optic, magnetic or electric, inducing chemical activation or acoustic waves inducing morphologic change of the layer i.e. break of the protective coating. For instance if the settable material is cement, deactivation of the protective layer may be triggered by the high pH of the cement slurry. After the cement slurry has been pumped into the well, the protective layer becomes in close contact with the cement slurry. Its high pH may then initiate the chemical degradation of the protective layer. This would only occur when the cement slurry is pumped into the well, thereby ensuring that swelling of the coating is delayed until the cement has been properly placed in the annulus.

The system of the invention also comprises a composition 20 made of a settable material 5 and a second swellable material 4. The second swellable material 4 is able to swell in contact with the second fluid 7. Preferably, the second swellable material remains in the swollen state when still subjected to second fluid. The second fluid 7 is any type of fluid, which may be liquid or gaseous or multi-phasic. The first and the second fluid (6, 7) can be the same, but also different. Preferably, the second fluid is aqueous or non-aqueous e.g. water, oil or hydrocarbon-based fluids or a combination thereof. Preferably also, the second swellable material 4 is substantially inactive during reaction of the first fluid 6 with the first swellable material 3. In this way, it exists a delay in activation process of the swellable materials: firstly, the coating 2 activates and after the second swellable material activates within the settable material 5. Accordingly, the settable material 5 is preferentially set when activation of the second swellable material 4 occurs.

The settable material 5 is any type of material that has the ability to go from a fluid state to a solid state with time, temperature, pressure changes, or under any physical or chemical stimulus. For example, examples of settable material are: cement, geopolymer, plaster, resin. Preferably, the settable material is a cementing composition 501 comprising a hydraulic binder, in general based on Portland cement (or another type of hydraulic material) and water. Depending on the specifications regarding the conditions for use, the cementing compositions can also be optimized by adding additives common to the majority of cementing compositions such as dispersing agents, anti-foaming agents, expansion agents (for example calcium oxide or magnesium oxide), fluid loss control agents, gas migration control agents, retarders, accelerators or still anti-settling agents, or additives of the type. Advantageously, formulations are preferably based on Portland cement in classes A, B, C, G and H as defined by ISO/API standards. Classes G and H Portland cements are preferred but other cements which are known in this art can also be used. For low temperature applications, aluminous cements and Portland/plaster mixtures or cement silica mixtures for wells exceeding 120° C. can be used.

The second swellable material 4 is able to swell in contact with the second fluid 7. As disclosed previously, when the settable material is cement, the second swellable material 4 is embodied preferably as rubber, in particular styrene butadiene rubber and ground rubber, poly 2,2,1-bicyclo-heptene (polynorbornene), alkylstyrene, crosslinked substituted vinyl-acrylate copolymers and diatomaceous earth. Mixture of two or more of these materials can also be used, in particular to provide cement that is susceptible to react to a large variety of subterranean hydrocarbons. The composition made of the cement and the second swellable material can also be called an adaptive cement system. Adaptive cement systems refers to cement systems which are self-healing or self-repairing, i.e. systems which can adapt to compensate for changes or faults in the physical structure of the cement, or which adapt their structure in the cementing of oil, gas, water or geothermal wells, or steam injection wells or wells with Enhanced Oil Recovery (EOR) or gas storage wells or the like. In addition to the specific self-healing additives able to swell in contact with reservoir fluid (hydrocarbon and/or water), the second swellable material can be preferably flexible. In this way, the potential combination of flexibility and toughness extends the range of mechanical properties of the settable system and second swellable material to extreme conditions. In another embodiment, the adaptive cement design can also contain flexible particles and/or fibers to improve respectively the flexibility and the toughness of the set material.

Various type of geometry may be used for the second swellable material: substantially spherical, ovoid, made in rods or in fibers.

In a further embodiment (not shown on Figure), the settable material 5 may comprise further other different swellable material.

In a further embodiment (not shown on Figure), the second swellable material 4 may comprise further a protective coating of the type disclosed above already. The protective layer surrounds the second swellable material and its purpose is to prevent and/or delay contact between the second swellable material 4 and the second fluid 7 and/or the first fluid 6. In this way, premature swelling is prevented and time for activation of the second swellable material 4 is allowed. When the second swellable material 4 are particles substantially spherical, the protective layer is preferably a uniform layer coating each particle, with a thickness $t_3$ between 20 to 60 micrometers.

Figure 5A:
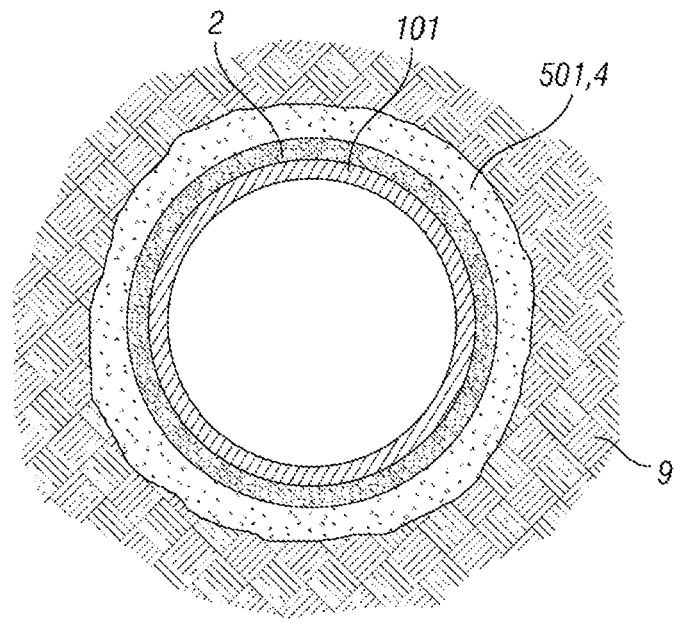
FIGS. 5A and 5B show the system according to the invention placed in the well.
Figure 5B:
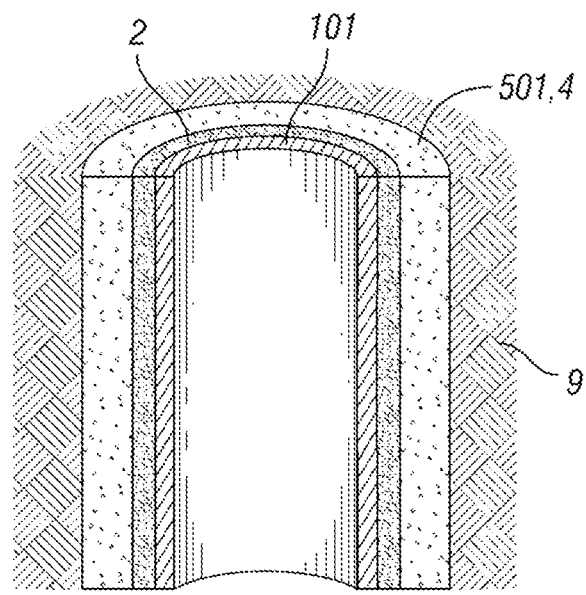

A further aspect of the invention discloses a method using the tubular 1 as a conventional casing 101 during normal primary cementing operations, as illustrated in FIG. 5A and FIG. 5B. The casing 101 is embodied as the tubular 1 described herewith, comprising the flexible swellable coating 2. The casing 101 is lowered down into the wellbore delimited by the formation 9. Cement slurry 501 comprising the second swellable material 4 is pumped into the annulus between the coating and the wellbore wall. The cement finally sets. And by swelling, the coating 2 is able to bridge gaps not filled with cement, particularly microannuli and the narrow side of the annulus in non-centralized configurations. Sealing fluid channels is achieved when swelling of the coating 2 is such that the swollen volume of the latter equals or tends to be greater than the size of the channel to seal. As a result, a differential pressure develops across the swellable coating which directly correlates with the sealing performance of the system. The flexible coating is also able to distribute the stress load from the casing 101 thereby decreasing the stresses on the cement. So the risk of crack formation is reduced by the presence of the flexible coating around the casing, its role being to spread the stress load applied on the cement. The use of a swellable and flexible coating 2 around the casing 101 associated with an adaptive cement 501 extends good zonal isolation in difficult cases encountered where the cement has not been placed properly (poor placement, poor or absence of centralization, slim holes, incomplete mud removal) and when the cement is likely to fail (development of microannuli, cracks). The flexible swellable coating 2 can be placed on the whole length of the casing or on smaller portions. It may comprise one layer or several layers of swellable material. It may also be reinforced.

After the second swellable material 4 is allowed to swell in contact with reservoir fluids the adaptive cement prevents and repairs losses of well integrity when they occur after placement and during life of the well. The activation will occur naturally by direct contact of the second swellable material and fluid when damage in the cement matrix will be sufficient to create a pathway in the cement matrix between fluids from the reservoir and second swellable material. For this aim the second swellable material has to be able to be activated when the damages will occur: either the second swellable material is present in sufficient amount or the second swellable material is protected, so that during reaction of the first swellable material 3 with the first fluid 6 and/or during setting of the settable material e.g. cement, the second swellable material is substantially inactive. The second swellable material may be rendered inactive directly by using a protective coating as disclosed above.

Method of the invention may be used for various types of application: it covers primary cementing, steam injection, Steam Assisted Gravity Drainage (SAGD), plug and abandonment, geothermal wells, gas storage well, heavy oil or any type of application that the skilled in the art may thing of.

Figure 1B:
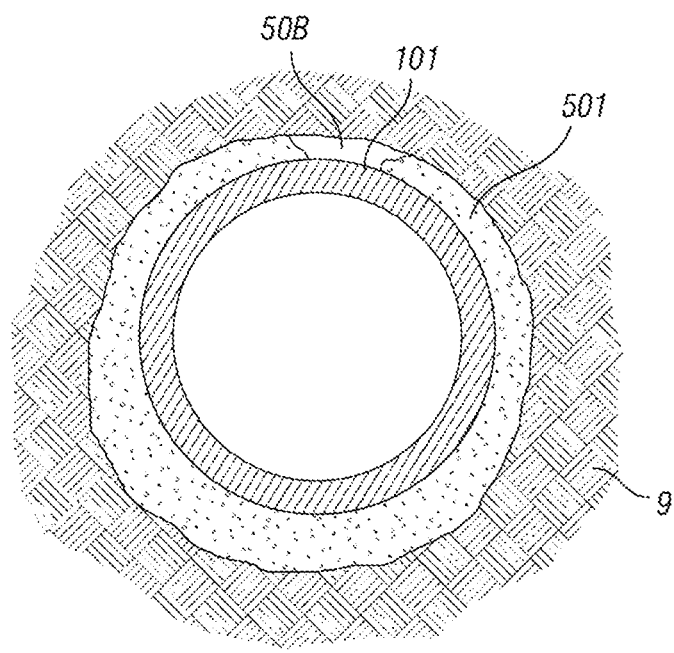
Figure 6A:
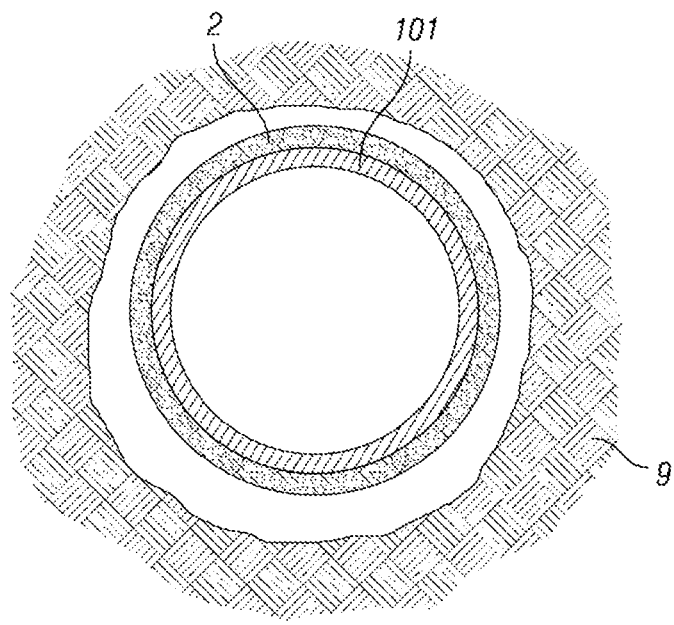
FIGS. 6A, 6B and 6C show the system according to the invention treating the zonal isolation problem of FIG. 1B.
Figure 6B:
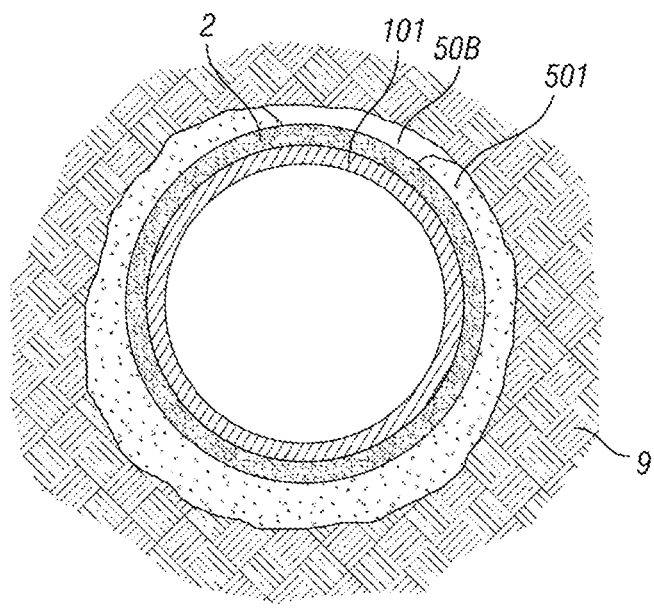
Figure 6C:
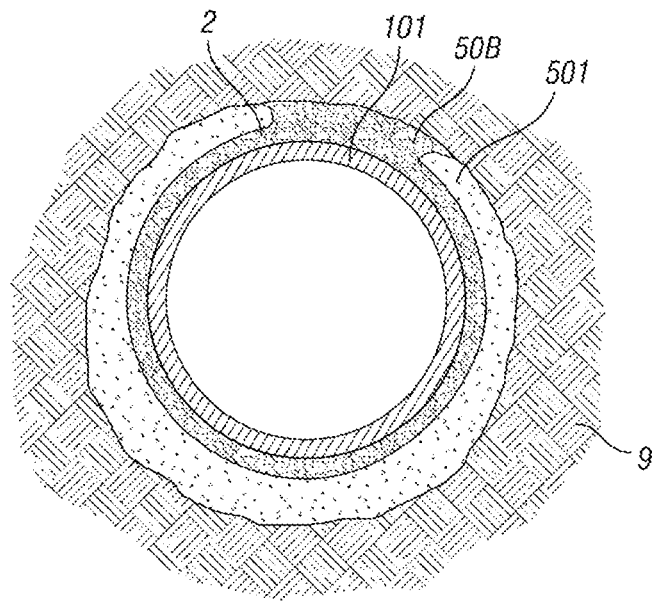

Accordingly, FIGS. 6A, 6B and 6C show the system of the invention treating the zonal isolation problem of FIG. 1B. The casing 101 with the coating 2 is lowered in a non-centralized configuration. FIG. 6B shows the well after primary cementing operation has been conducted. The cement 501 has not been placed properly, leaving a space 5B not filled with cement. The swellable coating 2 absorbs the fluid present in gap 5B and swells, thereby sealing the channel. FIG. 6C shows the coating 2 having expanded and sealed the gap 5B.

Figure 2A:
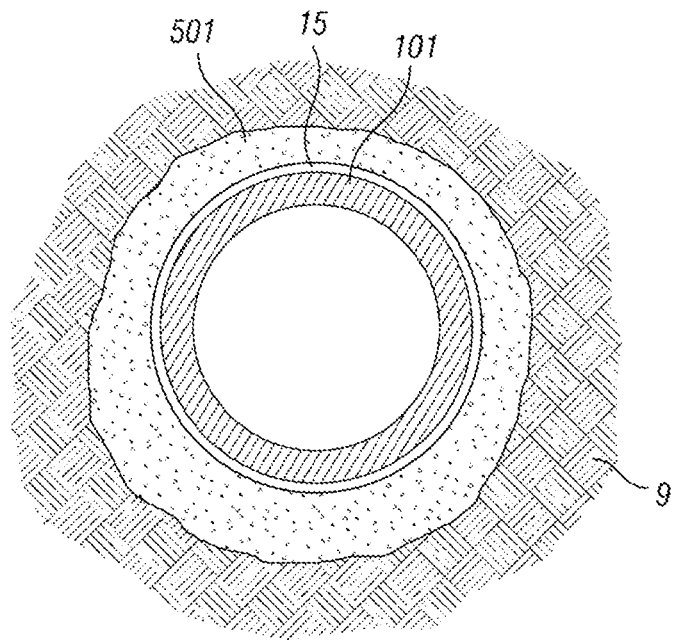
FIGS. 2A and 2B show two examples of micro annuli.
Figure 7A:
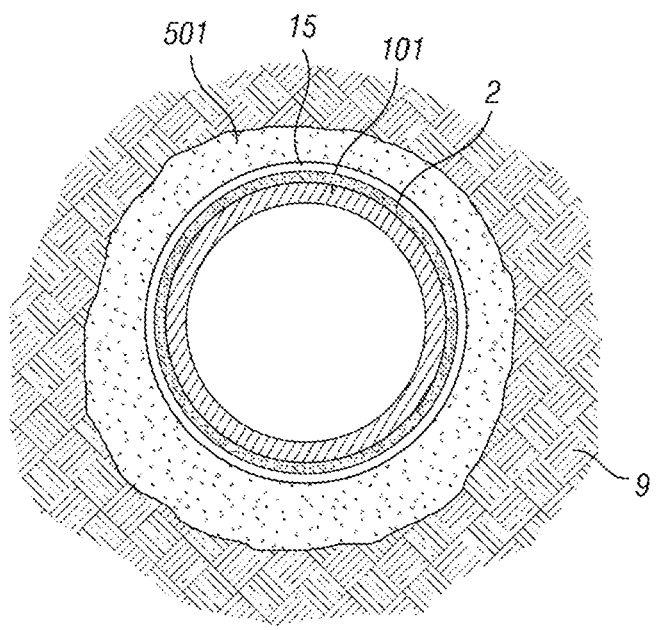
FIGS. 7A and 7B show the system according to the invention treating the zonal isolation problem of FIG. 2A.
Figure 7B:
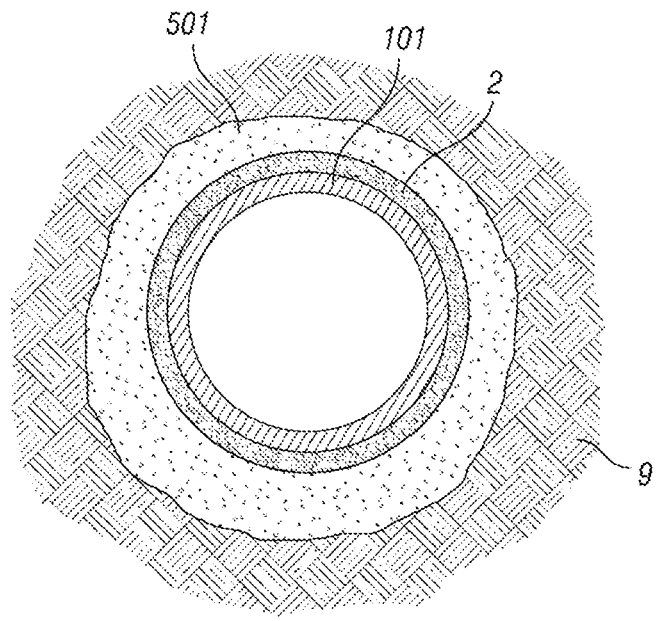

Accordingly, FIGS. 7A and 7B show the system of the invention treating the zonal isolation problem of FIG. 2A. A microannulus 15 is formed between the swellable coating 2 and the cement 501. The presence of the microannulus may result from a bad mud removal or debonding of the cement during its lifetime. The swellable coating 2 is again able to absorb fluids present in the microannulus 15 and to swell and seal the created channel, as shown in FIG. 7B.

Figure 2B:
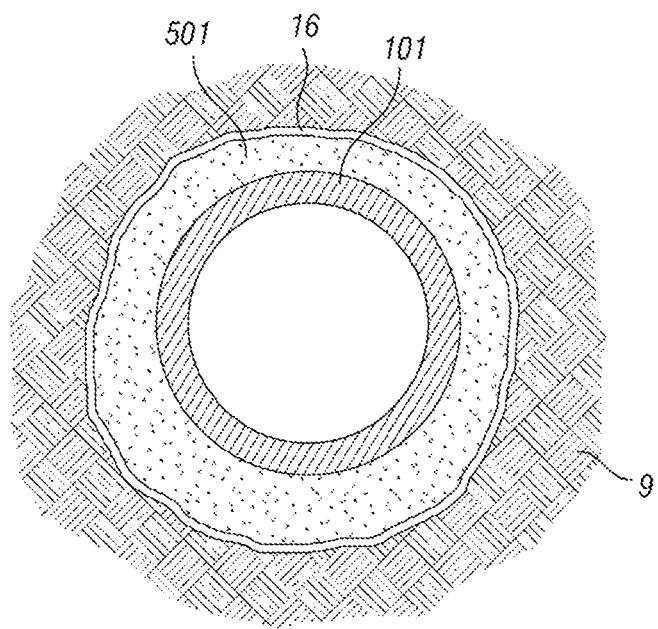
Figure 8A:
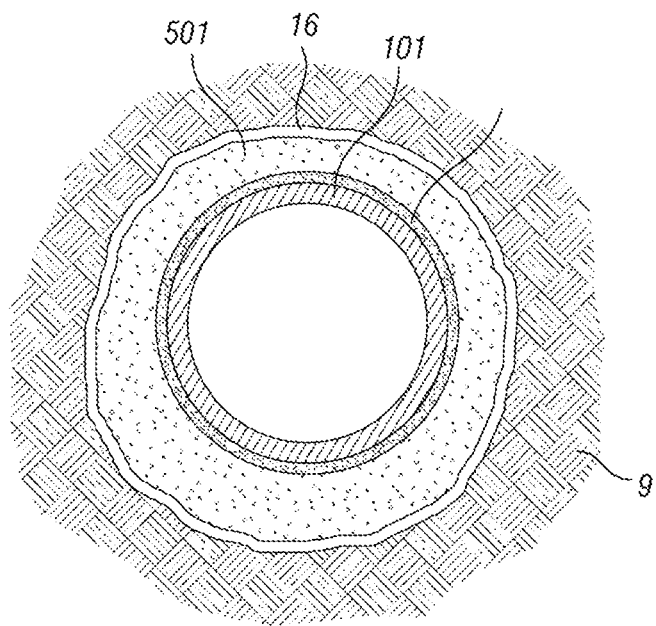
FIGS. 8A and 8B show the system according to the invention treating the zonal isolation problem of FIG. 2B.
Figure 8B:
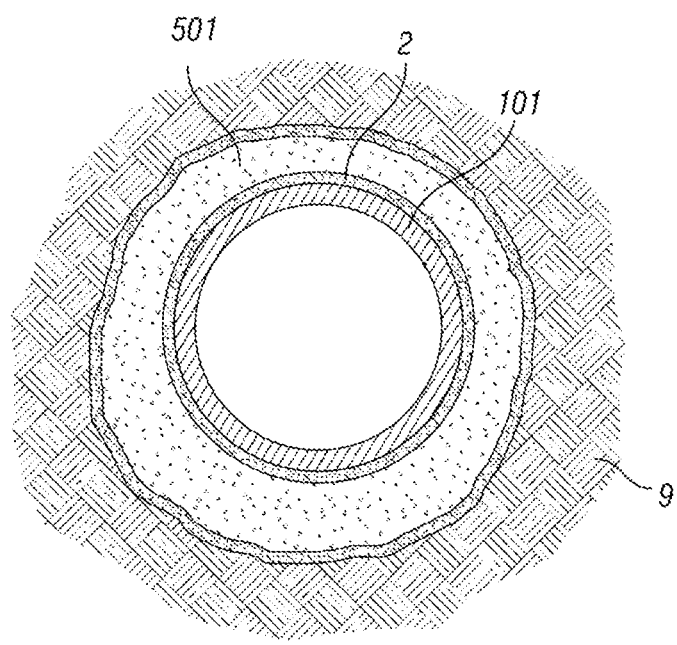

Accordingly, FIGS. 8A and 8B show the system of the invention treating the zonal isolation problem of FIG. 2B. A microannulus 16 is formed between the cement 501 and the formation wall 9. Again, the presence of the microannulus may result from a bad mud removal or debonding of the cement during its lifetime. Sealing of the created channel 16 is achieved by the auto-repairing action of the adaptive cement, as shown in FIG. 8B.

Figure 3:
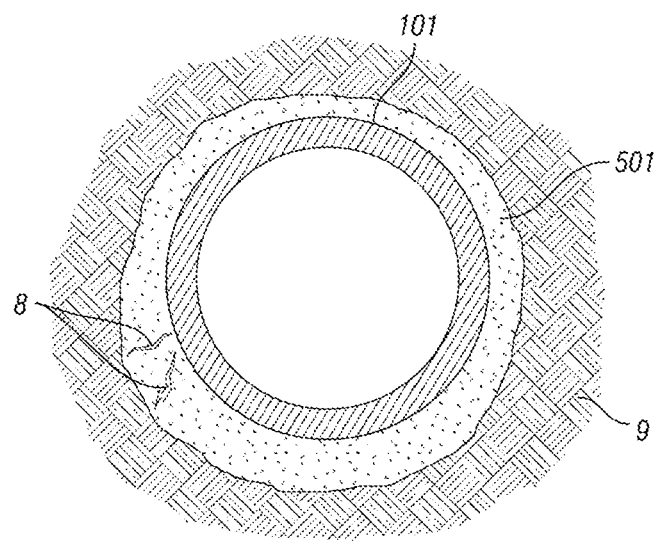
FIG. 3 shows an example of crack in cement.

Accordingly, to treat the zonal isolation problem of FIG. 3, formed by cracks 8, the auto-repairing action of the adaptive cement is also used. Those cracks may form in the cement during its lifetime.

The invention claimed is:
1. A sealing system comprising:
(i) a tubular having a first surface comprising a coating made of a first swellable material coating said first surface, wherein said coating forms a second surface, said first swellable material being able to swell in contact with a first fluid on said second surface; and

(ii) a composition made of a settable material and a second swellable material able to swell in contact with said first fluid, with a second fluid, or both, wherein the second swellable material does not swell during the swelling of the first swellable material, and the second swellable material does not swell until after the settable material has set;

characterized in that the second surface is coated by a protecting coating which is able to prevent or delay contact between the first swellable material and the first fluid.

2. The system of claim 1, wherein the coating is flexible.

3. The system of claim 1, wherein the first surface is the outer surface of the tubular.

4. The system according to claim 1, further comprising an alternative protective coating that coats said first swellable material and is able to prevent or delay contact between the first swellable material and the first fluid.

5. The system according to claim 1, further comprising a second protective coating that coats said second swellable material and is able to prevent or delay contact between the second swellable material and the first fluid, the second fluid or both.

6. The system according to claim 1, wherein the first fluid, the second fluid or both are selected from the group consisting of gas, water, oil, carbon dioxide, aqueous fluid, non-aqueous fluid, multi-phasic fluid and a combination thereof.

7. The system according to claim 1, wherein the coating further comprises a third swellable material able to swell in contact with a third fluid.

8. The system according to claim 1, wherein the settable material further comprises a fourth swellable material able to swell in contact with a fourth fluid.

9. The system according to any one of claim 1, wherein the settable material further comprises any element selected from the group consisting of fiber, flexible particle and a combination thereof.

10. The system according to claim 1, wherein the tubular is a casing.

11. The system according to claim 1, wherein the settable material is cement.

12. A method to consolidate a subterranean formation in a well, comprising:

lowering in the well, a tubular having a first surface comprising a coating made of a first swellable material coating said first surface, wherein the coating forms a second surface; and said first swellable material is able to swell in contact with a first fluid on said second surface;

placing a settable material and a second swellable material able to swell in contact with said first fluid, a second fluid or both, wherein said settable material and said second swellable material are placed adjacent to the second surface;

allowing the settable material to set; and allowing the first swellable material to swell in contact with the first fluid, wherein the second swellable material does not swell during the swelling of the first swellable material; and allowing the second swellable material to swell after the settable material has set.

13. The method of claim 12, wherein the first fluid and the second fluid have the same composition.

14. The method according to claim 12, wherein the coating is flexible.

15. The method according to claim 12, wherein the tubular comprises an alternative protective coating that coats said first swellable material that is able to prevent or delay contact between the first swellable material and the first fluid.

16. The method according to claim 12, wherein the settable material comprises a second protective coating that coats said second swellable material that is able to prevent or delay contact between the second swellable material and the first fluid and/or the second fluid.

17. The method according to claim 12, wherein the tubular is a casing.

18. The method according to claim 12, wherein the settable material is cement.

* * * * *